United States Patent
Ueda (10) Patent No.: US 9,165,739 B2
(45) Date of Patent: Oct. 20, 2015

(54) METHOD FOR MANUFACTURING FLAT DISPLAY

(71) Applicant: Yukinori Ueda, Hakusan (JP)

(72) Inventor: Yukinori Ueda, Hakusan (JP)

(73) Assignee: JAPAN DISPLAY INC., Mobara-Shi (JP)

( * ) Notice: Subject to any disclaimer, the term of this patent is extended or adjusted under 35 U.S.C. 154(b) by 374 days.

(21) Appl. No.: 13/748,058

(22) Filed: Jan. 23, 2013

(65) Prior Publication Data

US 2013/0189894 A1      Jul. 25, 2013

(30) Foreign Application Priority Data

Jan. 24, 2012   (JP) ................................ 2012-012220

(51) Int. Cl.
*H01J 9/24*     (2006.01)
*G02F 1/1333*   (2006.01)

(52) U.S. Cl.
CPC .......... *H01J 9/241* (2013.01); *G02F 1/133308* (2013.01); *G02F 2001/133331* (2013.01); *G02F 2202/28* (2013.01)

(58) Field of Classification Search
CPC .................................................... G02F 1/1303
See application file for complete search history.

(56) References Cited

U.S. PATENT DOCUMENTS

| 2010/0149452 A1 | 6/2010 | Harada et al. |
| 2011/0155317 A1 | 6/2011 | Shinoda et al. |
| 2011/0155318 A1* | 6/2011 | Shibata et al. ............ 156/275.5 |

FOREIGN PATENT DOCUMENTS

| JP | 2003-108038 A | 4/2003 |
| JP | 2005-55641 A  | 3/2005 |
| JP | 2006-058605   | 3/2006 |
| JP | 2008-209510 A | 9/2008 |
| JP | 2010-26539 A  | 2/2010 |
| JP | 2010-139759 A | 6/2010 |
| JP | 2010-217341 A | 9/2010 |
| JP | 2011-113047 A | 6/2011 |
| JP | 2011-150331 A | 8/2011 |
| JP | 2011-150332 A | 8/2011 |

OTHER PUBLICATIONS

First Office Action issued by Japanese Patent Office in Japanese Patent Application No. 2012-012220 mailed May 7, 2014 and the translations thereof (10 pages).

* cited by examiner

*Primary Examiner* — Mary Ellen Bowman
(74) *Attorney, Agent, or Firm* — Finnegan, Henderson, Farabow, Garrett & Dunner, LLP (57) ABSTRACT

According to one embodiment, a method for manufacturing a flat display includes applying a dot-like adhesive coating pattern in a region to be bonded on the surface of one of a display panel and a protective plate after forming a wall pattern along the outer circumference of the region to be bonded.

8 Claims, 7 Drawing Sheets

METHOD FOR MANUFACTURING FLAT DISPLAY

CROSS-REFERENCE TO RELATED APPLICATIONS

This application is used upon and claims the benefit of priority from Japanese Patent Application No. 2012-012220, filed Jan. 24, 2012, the entire contents of which are incorporated herein by reference.

FIELD

Embodiments described herein relate generally to a method for manufacturing a flat display.

BACKGROUND

Flat displays such as liquid crystal displays are widely used in, for example, computer displays, televisions, car navigation devices, portable information terminals, and mobile telephones.

In portable devices such as a mobile telephone or a portable information terminal, in vehicle-mounted equipment such as a car navigation device, and in some computers, a transparent protective plate is placed on an image display surface of a display panel. The protective plate prevents the image display surface of the display panel from being scratched and becoming difficult to view, and also prevents the display panel from being damaged even when dropped or subjected to a large impact.

The protective plate is generally set together with the casing of an electronic device when the electronic device is assembled. Therefore, it has heretofore been the case that there is a clearance between the protective plate and the display panel.

It has recently been suggested to directly attach the protective plate to the image display surface of the liquid crystal display panel via a bonding layer. This addresses the problem of the reflection in a glass surface caused by the presence of an air layer between the protective plate and the display panel. As a result, high-quality images can be displayed, and the manufacturing costs can be reduced by the reduction of the number of processes.

The protective plate can be bonded to the bonding layer by dropping, for example, a UV-curable adhesive coating solution to one of the protective plate and the bonding layer to attach the protective plate and the bonding layer to each other before the UV-cure of the solution. During the bonding, the formation of air bubbles in the bonding layer is prevented and the thickness of the bonding layer is minimized and made uniform so that high-quality images can be displayed. However, if the protective plate and the bonding layer are pressed to adjust the thickness of the bonding layer after the attachment, the spread of the forcibly crammed adhesive coating solution may not be stopped by surface tension and its viscosity, and the solution may run out of the space between the protective plate and the bonding layer and adhere to the display panel, leading to the deterioration of image quality. Thus, it has heretofore been the case that the protective plate and the bonding layer are attached to each other via the UV-curable adhesive coating solution, and are left after weakly pressed so that the UV-curable adhesive coating solution naturally spreads between the protective plate and the bonding layer to reduce the residual stress of the adhesive coating solution resulting from the pressing. It has therefore been difficult to further reduce the thickness of the bonding layer.

DETAILED DESCRIPTION

In general, according to one embodiment, a method for manufacturing a flat display includes:

forming a wall pattern on the surface of one of a display panel of a flat display and a protective plate configured to protect the display panel, along the outer circumference of a region to be bonded in which to provide a bonding layer between the display panel and the protective plate;

forming a dot-like adhesive coating pattern in the region to be bonded on the surface of one of the display panel and the protective plate;

attaching the protective plate and the display panel to each other via the adhesive coating pattern under normal pressures;

pressing the protective plate and the display panel under normal pressures and spreading out the adhesive coating pattern in the region to be bonded to form an uncured bonding layer; and curing the uncured bonding layer while the protective plate and the display panel are attached to each other, and forming a cured bonding layer.

The region to be bonded has a rectangular shape corresponding to a display region of the display panel.

Here, a point where bisectors of two angles located across one side join longitudinal central line of the rectangle is a first Y-shaped intersection, a point where bisectors of two angles located across the other side loin the longitudinal central line of the rectangle is a second Y-shaped intersection, and a twp-way Y-shaped line pattern is set. The two-way Y-shaped line pattern comprises a central line portion which connects the first and second Y-shaped intersections to each other, two branch lines extending from the first Y-shaped intersection to both ends of one short side, and two branch lines extending from the second Y-shaped intersection to both ends of the other short side. In this case, central points of the dot-like adhesive patterns are disposed on the central line portion in the two-way Y-shaped line pattern and on or in the vicinity of four branch lines, and disposed symmetrically with respect to the central line and the perpendicular bisector thereof.

The wall pattern is provided on the side opposite to the side where at least a driver of the display panel is provided. The wall pattern has ventilation holes at the intersections of this wall pattern, the longitudinal central line of the rectangle, the perpendicular bisector of the central line, the two branch lines extending from the first Y-shaped intersection to both ends of one short side, and the two branch lines extending from the second Y-shaped intersection to both ends of the other short side.

In the method for manufacturing a flat display According to the embodiment, the ventilation hole of the wall pattern is provided in a part where the adhesive coating pattern does not easily spread when the protective plate and the display panel are attached to each other via the adhesive coating pattern, and the wall pattern is provided in a part where the adhesive coating pattern easily spreads. Therefore, when the protective plate and the display panel are attached to each other via the adhesive coating pattern and then pressed to spread the adhesive coating pattern in the region to be bonded and thereby form the uncured bonding layer, the ventilation hole of the pattern serves as an escape of air to promote the spread of the adhesive coating pattern in the part where the adhesive coating pattern does not easily spread, whereas the wall pattern suppresses the spread of the adhesive coating pattern in the part where the adhesive coating pattern easily spreads. Thus, the use of the flat display manufacturing method according to the embodiment permits sufficient bonding without the adhesive running out of the display panel and the protective plate even if the protective plate and the display panel are attached to each other and then sufficiently pressed until the adhesive coating solution spreads to a predetermined thickness. A uniform bonding layer can be formed without the formation of air bubbles. Moreover, as the protective plate and the display panel can be sufficiently pressed after attached to each other, the bonding layer can be thinner and have a uniform thickness. Consequently, a flat display capable of high-quality image display is obtained by the flat display manufacturing method according to the embodiment.

In the flat display manufacturing method according to the embodiment, after the protective plate and the display panel that are attached to each other are pressed, the pressure can be maintained until the adhesive coating pattern is spread in the region to be bonded.

In the flat display manufacturing method according to the embodiment, the area of the adhesive coating pattern on the central line portion can account for 50 to 70% of the total area or total coating amount of the adhesive coating patterns, and the area of the adhesive coating pattern on the branch line can account for 30 to 50%.

In the flat display manufacturing method according to the embodiment, the aspect ratio of the rectangle is 1.3 to 2.0, the dot-like adhesive coating pattern on the central line portion is an ellipse having a major axis thereof disposed in a direction perpendicular to the central line, and the oblateness of the ellipse can be within a range of 0.5 to 2.5.

In the flat display manufacturing method according to the embodiment, on each branch line, the dot-like adhesive coating patterns are disposed in two parts located in the vicinity of the middle point of the branch line and in the vicinity of a corner of the rectangle. The adhesive coating pattern disposed in the vicinity of the corner can be smaller than the adhesive coating pattern disposed in the vicinity of the middle point.

In the flat display manufacturing method according to the embodiment, the display panel used has a connection peripheral edge which as continuous from the display surface via a step and which is connectable to the driver, and the protector used has a projecting region that covers the connection peripheral edge.

In the process of forming the adhesive coating pattern, an additional adhesive coating pattern can be further disposed in the region to be bonded in addition to the former adhesive coating pattern in the vicinity of the edge of the region to be bonded along the step. The additional adhesive coating pattern runs out of the region to be bonded to fill the space between the protecting region and the connection peripheral edge during the attachment.

In the flat display manufacturing method according to the embodiment, the step is located along the other short side, and the structure reinforcing coating patterns can be disposed symmetrically with respect to the central line in the vicinity of corners between the other short side and the central line.

The flat display manufacturing method according to the embodiment and a manufacturing apparatus for the same are described below with reference to FIG. 1 to FIG. 10.

A liquid crystal display that can be manufactured according to the embodiment is, for example, a small display for used in a mobile telephone or some other mobile devices. This image display surface of this display is a QWVGA (aspect ratio of 5:3, 400×240 pixels) of diagonally 2 to 8 inches, for example, 2.4 to 2.8 inches, a WVGA (aspect ratio of 16:9, 800×480 pixels) of diagonally 3.0 to 3.5 inches, or a half-XGA (aspect ratio of 16:9, 1024×480 pixels) of 5 to 5.5 inches.

Figure 9:
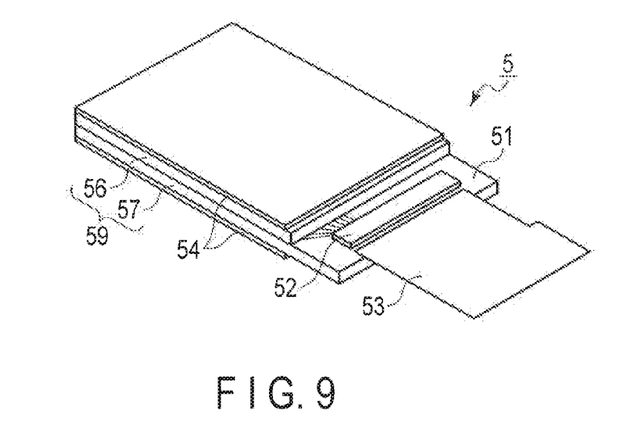
FIG. 9 is a schematic perspective view showing a conventional general small display panel.

FIG. 9 is a schematic perspective view showing a conventional general small display panel.

In the example of a display panel 5 shown in FIG. 9, an array substrate 57 projects from a counter substrate 56 to form a shelf-like peripheral edge connection 51 along one side of a rectangular plate-like display panel body 59. One drive IC chip 52 and one flexible printed circuit (FPC) board 53 are mounted on the peripheral edge connection 51 by the use of anisotropic conductive films (ACFs). Polarizing plates 54 are attached to both surfaces of the display panel 5.

Figure 10:
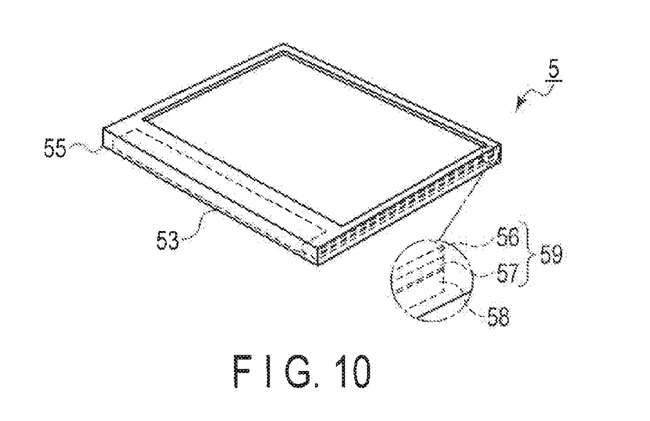
FIG. 10 is a schematic perspective view showing another example of a small display panel.

FIG. 10 is a schematic perspective view showing another example of a small display panel.

FIG. 10 shows another example of the display panel 5 that comprises a metal bezel cover 55 and a backlight unit 58. In the present specification, the display panel is not limited to the examples shown in FIG. 9 and FIG. 10, and includes various forms of display panels such as a display panel in which a drive IC is integrally provided in the peripheral edge of the array substrate 57.

Figure 1:
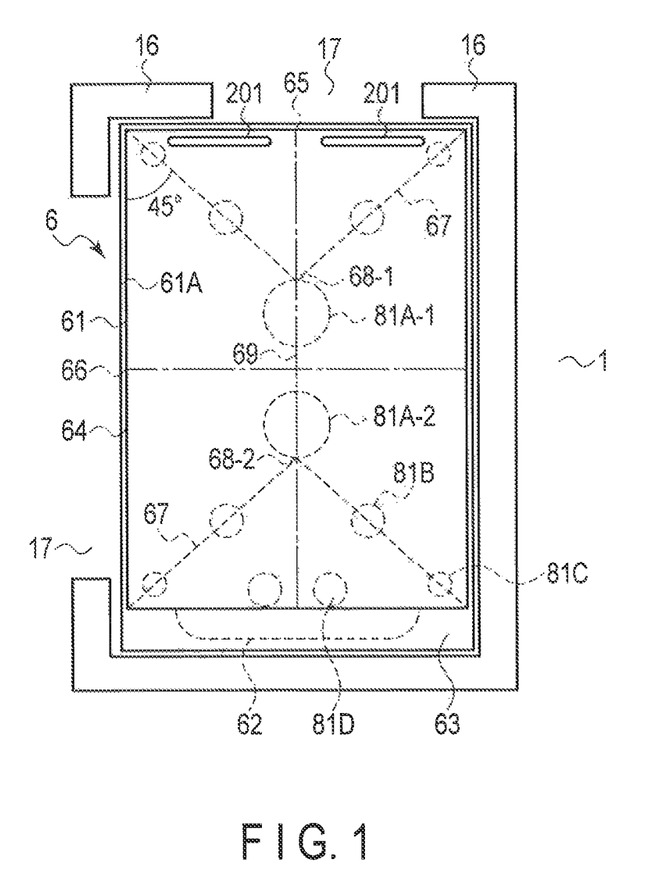
FIG. 1 is a plan view showing, by way of example, wall patterns, and coating patterns of an adhesive resin on a protective plate, in a method for attaching a protective plate according to one embodiment of the present invention.

FIG. 1 is a plan view showing, by way of example, wall patterns and coating patterns of an adhesive resin on a protective plate, in a method for attaching a protective plate according to the embodiment. A positioning jig on a coating stage (first suction unit) is also shown.

In the plan view of FIG. 1, there are shown a protective plate 6 attached to the display side surface of the display panel 5, adhesive resin coating patterns 81A-1, 81A-2, 81B, 81C, and 81D provided thereon, and a wall pattern 201 formed by the use of a transparent resin.

As the transparent resin to form the wall pattern, it is possible to use a resin which preferably has a repeated skeleton equivalent to or similar to the repeated skeleton of the adhesive resin.

Figure 2:
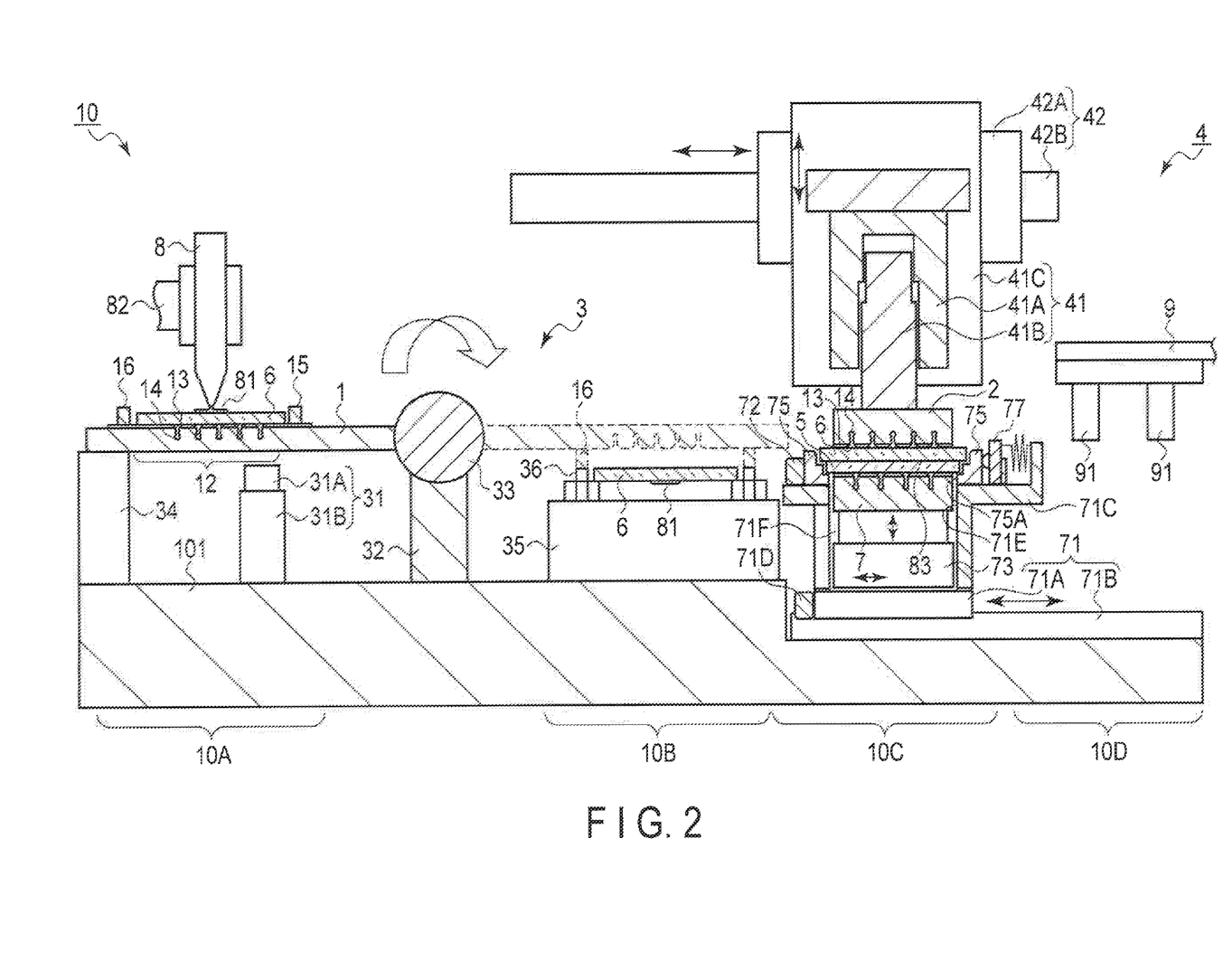
FIG. 2 is a schematic vertical sectional view of a protective plate attaching device used in one embodiment of the present invention.

A protective plate attaching device 10 according to the present embodiment is shown in a schematic sectional side view in FIG. 2.

The protective plate 6 is a transparent resin plate made of an acrylic resin or a polycarbonate resin or is a glass plate, and has a thickness of, for example, 0.5 to 1.0 mm. In a concrete example, the protective plate 6 is an acrylic resin plate having a thickness of, for example, 0.7 mm. An adhesive resin layer to bond the resin protective plate 6 to the glass plate liquid crystal display panel 5 is provided with a relatively large thickness of, for example, 0.05 to 0.3 mm, in particular, 0.08 to 0.2 mm (80 to 200 μm). In a concrete example, the thickness of the adhesive resin layer is 0.1 mm (100 μm). For the adhesive resin layer, it is possible to use a resin composite obtained by a UV-curable epoxy resin which is modified by silicone elastomer and to which precipitated silica is added as an inorganic filler. For example, the viscosity of an adhesive resin solution for coating at 25° C. is generally 1000 to 6000 mPa·s, and is preferably 2000 to 4000 mPa·s. Here, the viscosity is a value read by using a B-type viscometer BH II manufactured by Tokyo Keiki (Tokimec) Corporation and driving a rotor for 30 seconds after leaving the viscometer at rest. However, the viscosity ranges and the method for Measuring the same are illustrative only, and are not limited as long as the solution does not run down after coating even if inverted after coating and as long as there is no problem in the coating operation. Young's modulus (E) of the adhesive resin after completely curing is preferably 1 to 100 Mpa, for example, 5 to 20 Mpa.

A material such as an acrylic UV-curable resin can be used to form the adhesive resin coating pattern.

A material such as an acrylic UV-curable resin can be used for the wall pattern 201.

In order to coat the protective plate 6 with the wall pattern 201, for example, a coating nozzle equipped with an ultraviolet lamp is used, and ultraviolet light is radiated by the ultraviolet lamp while a wall pattern resin solution is discharged and dropped. This enables the coating and curing at the same time. The wall pattern 201 is again subjected to ultraviolet radiation after the attachment of the display panel and the protective plate to each other via the adhesive. Therefore, at the time of the creation of the wall pattern 201, the wall pattern 201 has only to be cured to the degree that can suppress the spread of the adhesive resin solution.

As shown in FIG. 2, the protective plate attaching device 10 includes the first suction unit (coating stage) 1, a second suction unit (press-bonding head) 2, and a third suction unit (press-bonding stage) 7 which respectively form horizontal vacuum chuck surfaces 12. The protective plate attaching device 10 also includes a first support drive mechanism 3, an adhesive solution coating nozzle 8, a robot arm 82, and a delivery stage 35. The first support drive mechanism 3 supports the coating stage 1 so that the coating stage 1 can be inverted, and inverts and drives the coating stage 1. The adhesive solution coating nozzle 8 coats, with an adhesive resin, the protective plate 6 held on the coating stage 1 when the coating stage 1 is upward. The robot arm 82 grasps and holds the adhesive solution coating nozzle 8. The delivery stage 35 receives the coated protective plate 6 from the coating stage 1 when the coating stage 1 is inverted. In the shown concrete example, the protective plate attaching device 10 further includes a second support drive mechanism 4, a mounting table 71C, and a third support drive mechanism 71. The second support drive mechanism 4 suspends and supports the press-bonding head 2, and vertically and horizontally moves. The mounting table 71C comprises the press-bonding stage 7 which is disposed upward. The third support drive mechanism 71 supports the mounting table 71C from beneath, and horizontally moves.

As shown in FIG. 2, the protective plate attaching device 10 also comprises a coating station 10A, a protective plate delivery station 10B, an attaching station 10C, and a display panel delivery station 10D. The coating station 10A comprises the coating stage 1, the adhesive solution coating nozzle 8, and the robot arm 82. The protective plate delivery station 10B comprises the delivery stage 35, the first support drive mechanism 3, and others. The attaching station 10C comprises the press-bonding head 2 and its vertical movement mechanism 41 as well as the press-bonding stage 7. The display panel delivery station 10D delivers the display panel 5.

As shown in FIG. 2, the coating stage 1, the press-bonding head 2, and the press-bonding stage 7 as the first to third suction units 2, 3, and 7 each have one rectangular vacuum chuck surface 12 of the same dimensions. A plurality of suction holes 13 are arranged in each vacuum chuck surface 12 in matrix form. Suction under reduced pressure is carried out by an unshown suction device through suction pipes 14 provided inside the suction surface 12.

The coating stage 1 is supported by a machine stand 101 of the protective plate attaching device 10 through a hinge 33 provided along one side of the rectangle of the coating stage 1 and through a hinge support 32. The coating stage 1 is mounted on and supported by a support 34 at the end (the left side in FIG. 2) opposite to the hinge 33 and other parts in an initial condition in which the vacuum chuck surface 12 is upward. In this condition, the coating stage 1 is stuck and fixed to the support 34, for example, by a magnet mechanism. A frame-like jig 16 which aligns the protective plate 6 with a predetermined part of the vacuum chuck surface 12 is, for example, screwed to the vacuum chuck surface 12 of the coating stage 1. The inside dimension of the frame-like jig 16, that is, the longitudinal and lateral dimensions of the region inside the frame-like jig 16 are slightly larger than the corresponding dimensions of the protective plate 6 to be handled. The protective plate 6 is pushed against one corner of the frame-like jig 16 and thereby positioned on the vacuum chuck surface 12. As shown in FIG. 1, the frame-like jig 16 is removed in its parts other than parts located in the vicinity of corners on the opposite side of the corner to be pushed, and thus forms positioning push gaps 17. This is designed to facilitate the operation to set the protective plate 6 to the vacuum chuck surface 12 of the first suction unit 1. If the protective plate 6 is set to a predetermined position, vacuum suction is started to fix the protective plate 6. When the protective plate 6 is set by the robot arm equipped with a suction mechanism, the positioning push gaps 17 are unnecessary. The part of the frame-like jig 16 shown in the upper left site of FIG. 1 can be eliminated.

If the protective plate 6 is positioned and fixed by suction, the adhesive solution coating nozzle 8 is horizontally driven by the robot arm 82, and then drops or discharges the resin solution, thereby forming a predetermined coating pattern 81 on the protective plate 6. The protective plate 6 is substantially entirely attached to the display surface of the display panel 5 via the adhesive resin except for a projecting region 63 corresponding to the peripheral edge connection 51 of the display panel 5. That is, the protective plate 6 is substantially entirely a region to be bonded 61 except for the projecting region 63 on one side. In general, a slight margin 64 is only present between the region to be bonded 61 and three edges of the protective plate 6. A black print pattern 61A is often provided in advance along four peripheral edges of the region to be bonded 61. The black print pattern 61A is typically disposed to have a width that extends from a part overlapping the edge of the region to be bonded 61 to the edge of the protective plate 6. The black print pattern 61A serves to, for example, prevent undesired leakage of light from the peripheral edge of the liquid crystal display. For example, when the black print pattern 61A has a large width of 5 mm or more, the edge of the region to be bonded 61 can be set inside the outer edge of the black print pattern 61A. That is, the inner part of the black print pattern 61A can be only filled with the adhesive resin layer after bonding. As the adhesive solution coating nozzle 8 and the robot arm 82, a dispenser system similar to that used to coat a sealing material for sealing the array substrate and the counter substrate can be used by properly modifying its setting.

Figure 3:
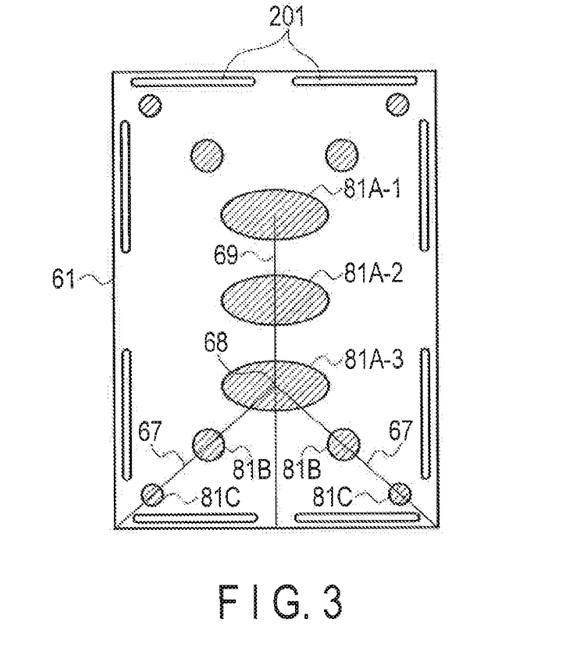
FIG. 3 is a plan view similar to FIG. 1, showing wall patterns and coating patterns according to another embodiment.

As a plurality of dot-like coating patterns 81 formed on the protective plate 6, one or more circular/elliptical coating points are arranged and used to let out air in response to the spread of the resin during attachment. In particular, patterns to be arranged under set rules are used. According to the present embodiment, as described below, patterns based on the "two-way Y-shaped line pattern" mentioned below as one such rule are employed, and conditions such as the area rate is additionally set. The dot-like coating patterns 81 include coating patterns 81A, 81A-1, 81A-2, 81A-3, 81B, 81C, and 81D. According to a preferred embodiment, the patterns are arranged under the following rules, for example, as shown in FIG. 1 and FIG. 3.

(1) The coating patterns 81 are, for example, circular or elliptical.

(2) Coating patterns 81A-1, 81A-2, 81B, 81C, and 81D are distributed line-symmetrically with respect to a central line 65 of the region to be bonded 61 and its perpendicular bisector 66.

However, in the shown concrete example, a pair of coating patterns 81D are provided on the side of the projecting region 63 alone. Coating patterns 81D cause the adhesive resin solution to infiltrate into a region 62 which covers and surrounds the drive IC chip 52, and allows the protective plate 6 to be bonded to the upper surface of the drive IC chip 52. That is, coating patterns 81D allow the connection structure between the display panel 5 and the protective plate 6 to be stronger, and improve the impact resistance of the liquid crystal display. Coating patterns 81D for the drive IC chip are disposed in the vicinity of corners between the rectangular region to be bonded 61 and the central line 65 on the side of the projecting region 63, and are distributed line-symmetrically with respect to the central line 65.

As in the example shown, coating patterns 81D which run out of the bonding region to reinforce the display panel 5 can be provided by coating simultaneously with coating patterns 81A-1, 81A-2, 81B, and 81C for bonding the display surface of the display panel 5 and the protective plate 6. In particular, the above-described arrangement allows the protective plate 6 to be attached to the entire upper surface of the drive IC chip 52 without air bubbles entering the adhesive resin layer, or allows the rear surface of the protective plate 6 to be attached to parts of the display panel 5 other than the display surface such as the peripheral edge connection 51. Coating patterns 81D for the structural reinforcement are not always necessary, and may be dispensed with depending on designs.

(3) The center of each of coating patterns 81A-1, 81A-2, 81B, and 81C is located on or in the vicinity of the "two-way Y-shaped line pattern" set as below. However, this does not apply to coating patterns 81D for the drive IC chip when coating patterns 81D are applied.

Lines that bisect four corners of the region to be bonded 61, that is, lines extending from the vertexes of four corners at an angle of 45 degrees to the respective sides are it assumed. Thus, a point where two lines that bisect two corners located across one short side of the region to be bonded 61 join the central line 65 is a first Y-shaped intersection 68-1, and a point where two lines that bisect two corners located across the other short side join the central line 65 is a second Y-shaped intersection 68-2. Four segments that connect the Y-shaped intersections 68 and the vertexes of the four corners of the region to be bonded 61 are branch lines 67. That is, parts of the lines that bisect four corners up to the central line 65 are the branch lines 67. On the other hand, a part of the central line 65 that connects the first Y-shaped intersection 68-1 and the second Y-shaped intersection 68-2 is a central line portion 69. Thus, the "two-way Y-shaped line pattern" is set. The "two-way Y-shaped line pattern" comprises one central line portion 69 or a corrected central line portion 69A, and four branch lines 67 extending in a Y-shape from both ends of the central line portion or from the vicinity of both ends.

That is, coating patterns 81A-1, 81A-2, 81B, and 81C for spreading the adhesive resin over the rectangular region to be bonded 61 are arranged along the "two-way Y-shaped line pattern" set by the bisectors of four corners and the central line.

However, when necessary, in particular, when the aspect ratio of the region to be bonded 61 (the length/width of the rectangle) is 1.2 to 1.35 and 1.7 to 2.2, the central line portion 69 is properly extended or contracted within about one third, that is, 20 to 45% of the length of the region to be bonded 61. For example, when the aspect ratio of the region to be bonded 61 is 1.2 to 1.35 and when the ratio of the total area of the coating patterns 81 to the area of the region to be bonded 61 is 15 to 20%, the central line portion 69 can be extended to the outside of the Y-shaped intersections 68 within 35 to 45% of the length of the region to be bonded 61. On the other hand, when the aspect ratio of the region to be bonded 61 is 1.7 to 2.2, the central line portion 69 can be smaller than the region between two Y-shaped intersections 68 so that the central line portion 69 will be set to a proper length which is 25 to 35% of the length of the region to be bonded 61. The central line portion 69 extended or contracted is referred to as the corrected central line portion 69A. When the central line portion 69 is thus extended or contracted, the term "two-way Y-shaped line pattern" is also used.

(4) Coating patterns 81A-1 and 81A-2 located on the central line portion 69 are set to account for 50 to 70% of the total coating amount. The same applies to the case based on the area because there is not a great difference in the thickness of the resin solution layers of coating patterns 81A-1, 81A-2, 81B, and 81C. That is, the rule has only to be such that coating patterns 81A-1 and 81A-2 located on the central line portion 69 should account for 50 to 70% of the total area of the coating patterns for the rectangular region to be bonded 61. However, when coating patterns 81D for the drive IC chip are applied, coating patterns 81D are not included in the calculation of the coating amount ratio or the area ratio.

(5) Coating patterns 81A-1 and 81A-2 located on the central line portion 69 have a circular shape, or an elliptical shape having its minor axis or major axis located on the central line 65. When more than one such coating patterns are disposed, these coating patterns are equal in shape or in coating amount or area. Here, the oblateness ([major axis-minor axis]/major axis) of the outlines of coating patterns 81A-1 and 81A-2 is 0 to 2.0. The space between coating patterns 81A-1 and 81A-2 located on the central line portion 69 is set to, for example, a distance which is about 0.3 to 0.7 times the diameter or minor axis of the coating pattern 81. However, when the aspect ratio of the region to be bonded 61 (the length/width of the rectangle) is about 1.1 to 1.2, only one elliptical or oval coating pattern 81A having its minor axis extending along the central line 65 can be disposed on the central line portion 69. The oblateness ([major axis-minor axis]/major axis) of the elliptical or oval shape in this case is, for example, 0.05 to 0.5.

When three coating patterns 81A-1, 81A-2, and 81A-3 are arranged on the central line portion 69, the central coating patterns 81 can be different in shape and size from the other two coating patterns 81A-1 and 81A-3. For example, the minor axis of the central coating pattern 81A-2 which is the dimension along the central line 65 can be smaller than those of the other two coating patterns located on the central line portion 69, and the major axes of all the coating patterns can be the same.

(6) A plurality of coating patterns, in particular, two coating patterns 81B and 81C are disposed on each branch line 67, and the inner coating pattern 81B is larger in coating amount and area than the outer coating pattern 81C. Here, the ratio of the coating amount or area is, for example, 1.5 to 2.5.

(7) A pair of coating patterns 81D provided on the side of the projecting region 63 alone are disposed in the region to be bonded 61 in the vicinity of an intersection of the central line 65 and the edge of the rectangular region to be bonded 61 on the side of the projecting region 63. The coating amount and area of coating patterns 81D are set so that the adhesive resin solution which has infiltrated during press bonding may completely fill the space between the drive IC chip 52 and the protective plate 6 and so that the protective plate 6 may be mechanically connected to the entire upper surface of the drive IC chip 52. Particularly preferably, the coating amount and area of coating patterns 81D are set to seal the drive IC chip 52 and the others by covering four peripheral portions of the drive IC chip 52 and covering terminal portions of the drive IC chip 52 and terminal portions on the peripheral edge connection 51 of the display panel 5.

The peripheral edge connection 51 of the display panel 5 is a part where at least either the drive IC chip 52 or the flexible printed circuit (FPC) board is mounted. As this is a projecting part of one of the substrates serving as the display panel 5, this part is an extension which is smaller in thickness than the part serving as the display surface and which continues from the display surface part via the step. Therefore, the flat display may be damaged when subjected to a large impact. Accordingly, it can be preferable to provide the protective plate 6 with the projecting region 63 covering the peripheral edge connection 51, and fill the space between the peripheral edge connection 51 and the projecting region 63 with a resin material such as a curable resin solution and then cure this resin or nut a resin spacer material in the space. However, when the space is filled with the curable resin solution in a process different from the attachment of the protective plate 6, manufacturing costs increase because of the increase of processes and additionally needed devices and operators. On the other hand, when the resin spacer material is attached to the peripheral edge connection 51 in advance, product costs increase because of the increase in the number of components, or manufacturing costs increase because of the increase of control items resulting from the necessity of thickness control. In the case in which a decorative sheet and the spacer come into contact earlier than the completion of the spread of the resin during the attachment of the decorative sheet to the LCD, the spread of the resin may be inhibited, and an air bubble defect may be caused. In contrast, for example, if coating patterns 81D for the structural reinforcement according to the embodiment shown are provided together with coating patterns 81A-1, 81A-2, 81A-3, 81B, and 81C for attachment, the coating time slightly increases, but no additional processes are needed, so that the structure can be reinforced simultaneously with the attachment of the protective plate 6. As a result, the margin of increase in manufacturing costs due to the structural reinforcement can be extremely small.

When the peripheral edge connection 51 is provided along one long side of the rectangle of the region to be bonded 61, a plurality of coating patterns 81D for the structural reinforcement are provided along this lone side.

Now, a mechanism for attaching and press-bonding the protective plate 6 having a plurality of coating patterns 81 formed therein to the display panel 5 is described.

As shown in the right side of FIG. 2, the press-bonding head (second suction unit) 2 is suspended and supported by the second support drive mechanism 4, the second support drive mechanism 4 is supported by the machine stated 101 of the protective plate attaching device 10 through an unshown support frame. The second support drive mechanism 4 comprises as vertical movement support mechanism 41 including a servomechanism and a drive power source for vertically moving the press-bonding head 2, and a horizontal movement support mechanism 42 for horizontally moving the vertical movement support mechanism 41 and the press-bonding head 2 in the lateral direction of FIG. 2. In the shown concrete example, the vertical movement support mechanism 41 for vertically moving the press-bonding head 2 includes a pneumatic cylinder for applying predetermined pressure during pressing, and a cylinder rod 41A connected to the center of the upper surface of the second suction unit 2 is fitted to an external cylinder 41B. An unshown diaphragm for sealing an air chamber is also provided. The upper end of the external cylinder 41B is connected to the drive end of a vertical movement driver 41C based on the servomechanism. In the meantime, the horizontal movement support mechanism 42 comprises, for example, a horizontal slide portion 42A in which the support end of the vertical movement driver 410 is fitted, a horizontal rail 42B which is engaged with the horizontal slide portion 42A and which is fixed by the machine stand 101, and an unshown horizontal drive mechanism connected to the horizontal rail 42B. The horizontal drive mechanism comprises, for example, a pneumatic cylinder and a servomechanism, and is capable of being rapidly moved in the lateral direction of FIG. 2 by the pneumatic cylinder and also capable of alignment operation by the servomechanism. Although not shown, the vertical movement support mechanism 41 is provided with a guide mechanism for keeping the lower surface of the press-bonding head 2 horizontal when necessary. For example, a flange or a horizontal support plate projects from the upper part of the press-bonding head 2 to the horizontally outer side, and a plurality of vertical guide bars are supported by the horizontal slide portion 42A or the machine stand 101 and inserted through holes in the flange or the horizontal support plate.

In one concrete example, the press-bonding stage 7 is set in the upper part of a position adjustment table 73, as shown in the Lower right end of FIG. 2. The position adjustment table 73 is an XYθ table which enables fine positional adjustment in the directions along two axes (X- and Y-axes) perpendicular to each other in a horizontal plane, and the adjustment of the position and posture in a direction of rotation (θ) around the vertical axis. The press-bonding stage 7 comprises a vertical movement (X-axial movement) mechanism capable of switching between an upwardly projecting position and a lowered position. In the meantime, the mounting table 71C is supported by the machine stand 101 through the third support drive mechanism 71 so that the mounting table 71C can horizontally move. The mounting table 71C comprises an opening 71E in its mounting surface, and the press-bonding stage 7 can be inserted through the opening 71E. The mounting table 71C also comprises, under the Opening 71E, a cavity 71F for receiving the position adjustment table 73 and the press-bonding stage 7.

The position adjustment table 73 and the press-bonding stage 7 can be configured to be connected to and supported and driven by a movable portion of the third support drive mechanism 71 together with the mounting table 71C while being stored in the cavity 71F. Alternatively, the position adjustment table 73 and the press-bonding stage 7 can be configured to be directly supported by the machine stand 101 and thereby prevented from horizontal movement. In this case, when the mounting table 71C on which the display panel 5 is mounted in the display panel delivery station 10D is moved to the attaching station 10C by the third support drive mechanism 71, the press-bonding stage 7 and the position adjustment table 73 are accommodated in the cavity 71F of the mounting table 71C through an opening 71G in the lower side surface of the mounting table 71C. The press-bonding stage 7 then projects upward through the opening 71E in the mounting surface, and sucks the display panel 5.

Figure 6:
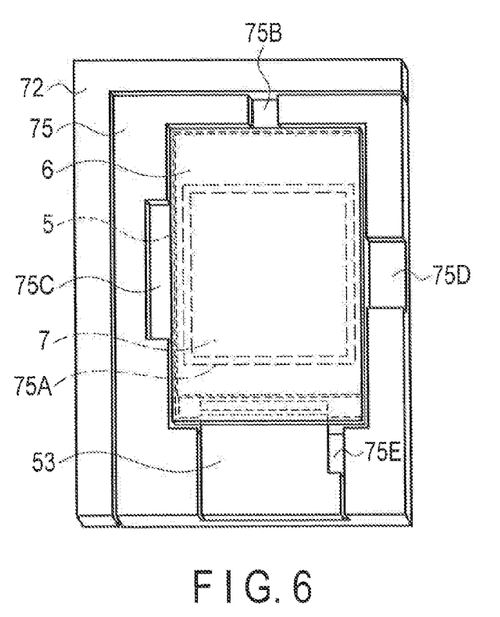
FIG. 6 is a schematic perspective view showing a tray jig and a positioning jig on a press-bonding stage that are used in the embodiment of the present invention.

FIG. 6 is a schematic perspective view showing a tray jig and a positioning jig on the press-bonding stage (third suction unit) that are used in one embodiment of the present invention.

Figure 7:
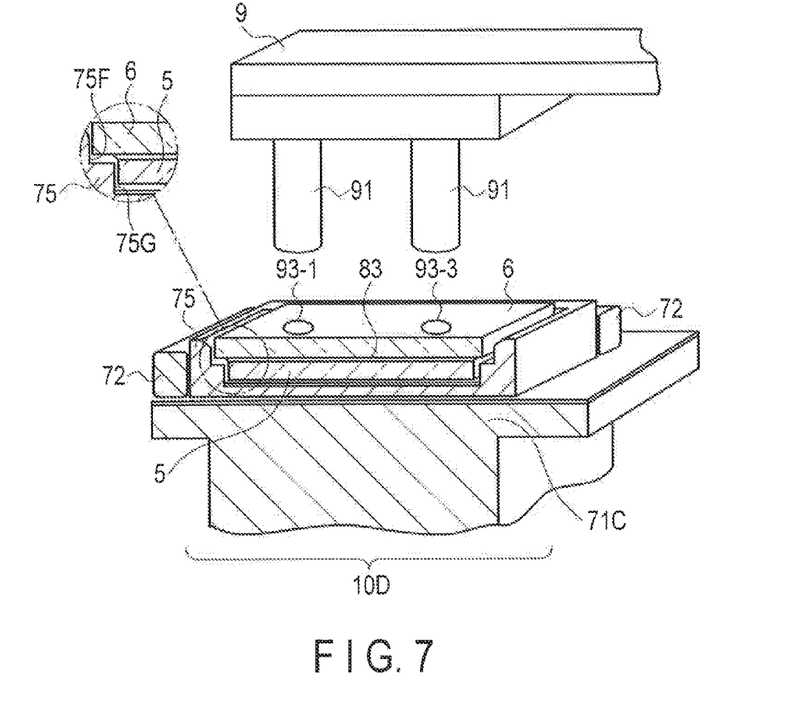
FIG. 7 is a schematic vertical sectional view showing how a protective plate and a display panel are temporarily fixed by local UV radiation.

FIG. 7 is a schematic vertical sectional view showing how the protective plate and the display panel are temporarily fixed by local UV radiation.

As shown in FIG. 2, FIG. 6, and FIG. 7, a positioning jig 75 is held to the mounting surface of the mounting table 71C, and the display panel 5 is disposed in the positioning jig 75. In the middle of and after the attaching process, the protective plate 6 is disposed in the positioning jig 75 together with the display panel 5. As shown in FIG. 2 and FIG. 6, an opening 75A substantially corresponding to the opening 71E of the mounting table 71C is provided in the bottom wall of the positioning jig 75. As shown in FIG. 2 and FIG. 6, a positioning jig 72 which is L-shaped in the plan view is provided in the mounting surface of the mounting table 71C to align the positioning jig 75 with the mounting table 71C. When in abutment with the positioning jig 72, the positioning jig 75 is positioned at a predetermined position on the mounting table 71C. In the example shown in FIG. 2, a pushing portion 77 is provided on the mounting table 71C to horizontally push the positioning jig 75 toward the positioning jig 72 so that the positioning jig 75 may be kept positioned. In the shown concrete example, the pushing portion 77 comprises a portion upwardly projecting from the edge of the mounting table 71C, a spring fixed to the inside of the upwardly projecting portion, and a pushing piece fixed to the end of the spring. In one concrete example shown in FIG. 6, grip recesses 75B, 75C, and 75D are provided along the centers of three sides of the display panel 5 in the frame portion of the positioning jig 75. An operator can put the fingers in the grip recesses 75B, 75C, and 75D and easily hold up the display panels when necessary. A recess 75E having a large area so receive the FPC board 53 is provided in a part along remaining one side of she display panel 5.

As shown in FIG. 2, the support drive mechanism 71 which supports and horizontally moves the mounting table 71C comprises a slide portion 71A, a horizontal rail 71B, and an unshown horizontal drive mechanism connected to the slide portion 71A. The mounting table 71C is fixed to the upper surface of the slide portion 71A. The slide portion 71A is engaged with the rail 71B, and the rail 71B is fixed to the upper surface of the machine stand 101. The horizontal drive mechanism comprises, for example, a pneumatic cylinder mechanism. In response to the operation of the pneumatic cylinder mechanism, the suction unit 7 rapidly moves to the display panel delivery station 10D from the attaching station 10C or rapidly moves in a reverse direction. For this movement, the third suction unit 7 is lowered to the position under the mounting table 71C in advance. In the concrete example shown in FIG. 2, an abutment stopper 71D is provided at the end of the horizontal rail 71B so that the third suction unit 7 is positioned at predetermined positions of the left and right stations 10C and 10D after rapid lateral movement.

FIG. 7 shows how the display panel 5 and the protective plate 6 are aligned in the positioning jig 75 and how UV light is spot-radiated in this condition. As schematically shown by partly enlarged portions in FIG. 3, after or when the display panel 5 and the protective plate 6 are attached to each other across an uncured adhesive resin layer 83, the display panel 5 and the protective plate 6 are brought into abutment with positioning surfaces 75F and 75G formed by the inner wall surfaces of the positioning jig 75 on one lateral side and one longitudinal side and are thereby aligned with each other. Therefore, as in the case of the positioning of the positioning jig 75 shown in FIG. 6, the display panel 5 and the protective plate 6 are pushed against one corner of the positioning jig 75, in particular, a corner corresponding to the corner of the positioning jig 72 and are thereby aligned with each other. For example, this pushing is enabled by, before full press-bonding operation, unsucking the display panel 5 and the protective plate 6 and then putting the fingers in the near and right recesses 75D and 75E and to press the display panel 5 and the protective plate 6 after the adhesive resin patterns 81 on the lower surface of the protective plate 6 have come into contact with the upper surface of the display panel 5 at the time of attachment. In this case, the position adjustment table 73 can be omitted.

In this aligned state, a spot radiation device 9 is used to apply UV light to a predetermined radiation spot 93. Thus, the display panel 5 and the protective plate 6 are "temporarily fixed" in alignment with each other. This spot radiation can be performed by the mounting table 71C and the positioning jig 75, for example, in the display panel delivery station 10D at a distance from the press-bonding station 10C. The display panel 5 and the protective plate 6 are taken out of the positioning jig 75 after the misalignment is prevented by the spot radiation, and sent to a full radiation station for applying UV light to the entire surface of the adhesive resin layer or to a heat chamber for curing the adhesive resin layer by heating. In the display panel delivery station 10D, the display panel 5 with the protective plate 6 can be taken out of the positioning jig 75, or the positioning jig 75 and all can be taken out of the mounting table 71C. In some cases, the positioning jig 75 and all can be set in the UV radiation chamber or the heat chamber.

The flow of the process of attaching the protective plate 6 according to the present embodiment is briefly described below with reference to FIG. 2.

(1) Step 1 (the setting and alignment of the protective plate 6): The protective plate 6 is disposed in the frame-like jig 16 on the coating stage (first suction unit) 1 when the coating stage 1 is in an initial position/posture. The protective plate 6 is then aligned by putting the fingers from the positioning voids 17 of the frame-like jig 16 shown in the upper and left parts of FIG. 1 and pushing the protective plate 6 into the corner shown in the lower right part of FIG. 1. If the positioning is completed, vacuum suction from the vacuum chuck surface 12 is started to fix the protective plate 6.

(2) Step 2 (the application of the adhesive resin solution): The robot arm 82 is operated, and the resin solution is discharged from the adhesive solution coating nozzle 8 at the same time. In this way, a plurality of predetermined coating patterns 81 are formed on the protective plate 6.

(3) Step 3 (the inversion and holding of the protective plate 6): When the coating is completed, the adhesive solution coating nozzle 8 is evacuated to an initial position by the robot arm 82, and the coating stage 1 is then inverted. In this case, an ejector 31 comprising a resin ejector pin 31A and a pneumatic cylinder 31B is actuated. After the inversion, the coating stage 1 is unsucked, and the protective plate 6 is transferred to the delivery stage 35. In this condition, the protective plate 6 is horizontally disposed at a predetermined place so that the surface in which the coating patterns 81 are formed is faced down. At the same time, in the example shown, the protective plate 6 is supported by a support pin 36 from beneath at the position of the frame-like jig 16. The coating stage 1 is inverted and restored to the initial position by an unshown similar elector 31.

(4) Step 4 (sending to the press-bonding place): The press-bonding head (second suction unit) 2 is rapidly moved to the position above the delivery stage 35 by the operation of the horizontal movement support mechanism 42. The press-bonding head 2 is then brought into abutment with the outer surface (the upper surface in this condition) of the protective plate 6 by the operation of the vertical movement driver 41C. When the press-bonding head 2 is brought into abutment, the suction mechanism of the press-bonding head 2 is actuated to suck the protective plate 6. The press-bonding head 2 is immediately lifted slightly upward by the vertical movement support mechanism 41, and restored to the position for press-bonding by the horizontal movement support mechanism 42. Instead of providing a horizontal movement mechanism of the press-bonding head 2, the robot arm or the operator can grip both ends of the protective plate 6, and lift up the protective plate 6 from the delivery stage 35 into abutment with the press-bonding head 2 so that the protective plate 6 will be sucked at a predetermined position.

On the other hand, simultaneously with the movement of the press-bonding head 2 to the position above the delivery stage 35, the mounting table 71C is moved in the opposite direction to the right end of FIG. 2 by the third support drive mechanism 71 comprising a pneumatic cylinder and others. In this place, the positioning jig 75 in which the display panel 5 is stored is mounted on the mounting table 71C. In this case, the positioning jig 75 is brought into abutment with the L-shaped positioning jig 72. Moreover, the display panel 5 is pushed into the corner of the positioning jig 75 corresponding to the corner of the positioning jig 72. Thus, the display panel 5 is positioned at a predetermined position on the mounting table 71C. The mounting table 71C is then restored to the press-bonding position simultaneously with the restoration of the press-bonding head 2 to the press-bonding position. At this point, the press-bonding stage 7 passes through the opening 75A of the positioning jig 75 into abutment with the display panel 5, and suction is immediately performed.

(5) Step 5 (press-bonding): The press-bonding operation is performed after the confirmation of the fact that the protective plate 6 and the display panel 5 are roughly aligned. In this case, the press-bonding head 2 is lowered as rapidly as possible slightly before the lower ends of the coating patterns 81 adhering to the lower surface of the protective plate 6 come into contact with the upper surface of the display panel 5. The press-bonding head 2 is then slowly lowered to slowly bring the lower ends of the coating patterns 81 into contact with the upper surface of the display panel 5. After this preliminary press-bonding, the protective plate 6 is unsucked by the press-bonding head 2, and the protective plate 6 is pushed against the corner of the positioning jig 75 on the side of the corner of the positioning jig 72 and thereby aligned. The press-bonding head 2 is then again lowered for full press-bonding. During the full press-bonding, the press-bonding head 2 is first lowered relatively rapidly so that air bubbles escape from the adhesive resin layer 83. The lowering is the stopped, and a pressed condition is maintained for a predetermined time. The press-bonding head 2 can be then further lowered to maintain a pressed condition stronger than the initial pressed condition until the adhesive resin layer 83 is spread out in the region to be bonded. When the full press-bonding is completed, the press-bonding head 2 is lifted, and the press-bonding stage 7 is lowered.

(6) Step 6 (sending after press-bonding): When the lifting of the press-bonding head 2 is started, the mounting table 71C is moved to the position to deliver the display panel. At this position, the adhesive resin layer 83 is locally cured into a dot shape by local UV radiation as shown in FIG. 7, and is thereby "temporarily fixed". When the radiation spot 93 shown in FIG. 7 is provided, the spot radiation device 9 having four UV spot light sources 91 such as LEDs is used. At the point where the local UV radiation is finished, the display panel 5 with the protective plate 6 is removed from the mounting table 71C together with the positioning jig 75. The positioning jig 75 in which a new display panel 5 is stored is again positioned and set on the mounting table 71C, and then the mounting table 71C is restored to the press-bonding position. In the meantime, the press-bonding head (second suction unit) 2 receives the protective plate 6 from the protective plate delivery stage 35, and is restored to the press-bonding position. When the display panel 5 to which the protective plate 6 is attached is sent to the UV radiation chamber together with the positioning jig 75 for the following step 7, the above-described "temporarily fixing" by UV radiation can be omitted.

(7) Step 7 (curing of the adhesive resin layer): After the above-described "temporarily fixing", the display panel 5 to which the protective plate 6 is attached is taken out of the positioning jig 75, and ultraviolet light is applied to the entire surface of the adhesive resin layer 83. If necessary, heat curing is then performed in the heat chamber or a weather resistant test chamber, and the attachment is completed.

Now, embodiments of the wall pattern and the coating pattern are described in more detail with reference to FIG. 1, FIGS. 3 to 5, FIG. 12, and FIG. 13.

In the embodiment shown in FIG. 1, the outline of each of the coating patterns 81 is circular, and its center is located exactly on the above-mentioned "two-way Y-shaped line pattern". More specifically, two coating patterns 81A are provided on the central line portion 69 in the bonding region 61 having a diagonal dimension of 2.8 inches and an aspect ratio of 1.42. The diameter of coating pattern 81A on the central line portion 69 is 7.8 mm, the diameter of the inner coating pattern 81B on the branch line 67 is 3.6 mm, and the diameter of the outer coating pattern 81C on the branch line 67 is 2.8 mm. Therefore, when coating patterns 81D for the drive IC chip are excluded, the two coating patterns 81A on the central line portion 69 account for 60% of the total area of the coating patterns, the four inner coating patterns 81B on the branch lines 67 account for 25%, and the four outer coating patterns 81C on the branch line 67 account for 15%. Each of coating patterns 81D for the drive IC chip are equal in diameter and area to each of the inner coating patterns 81B on the branch lines 67. Thus, the two coating patterns 81A on the central line portion 69 account for 53% of the total area of the coating patterns 81 including coating patterns 81D for the drive IC chip. When coating patterns 81D for the drive IC chip are not taken into consideration, the total area of the coating patterns 81 accounts for about 8% of the area of the region to be bonded 61. When coating patterns 81D for the drive IC chip are included, the total area of the coating patterns 81 accounts for about 9%.

On the other hand, the center of the inner coating pattern 81B on the branch line 67 is located in the vicinity of the bisector of the branch line 67, more specifically, located about 40% of the length of the branch line 67 apart from the Y-shaped intersection 68. The center of the outer coating pattern 81C on the branch line 67 is located in the vicinity of the corner of the rectangular region to be bonded 61, more specifically, located about 85% of the length of the branch line 67 apart from the Y-shaped intersection 68. The outer end of coating pattern 81D for the drive IC chip substantially reaches the edge of the region to be bonded 61, and the distance from the outline to the central line 64 is substantially equal to the radius of coating pattern 81D.

In the embodiment shown in FIG. 1, the wall pattern 201 is provided along the short side of the rectangular region to be bonded 61 opposite to the short side where the driver of the display panel is provided. The wall pattern 201 is provided with a ventilation hole at the intersection of this wall pattern and the longitudinal central line of the rectangle, and is divided into two parts. The adhesive coating pattern easily spreads in the part where the wall pattern 201 is formed, and the adhesive coating pattern does not easily spread in the part where the ventilation hole is formed. For example, even if the protective plate 6 and the display panel 5 are pushed more forcefully, the ventilation hole of the pattern can serve as an escape of air to promote the spread of the adhesive coating pattern in the part where the adhesive coating pattern does not easily spread, whereas the wall pattern can suppress the spread of the adhesive coating pattern in the part where the adhesive coating pattern easily spreads.

Figure 12:
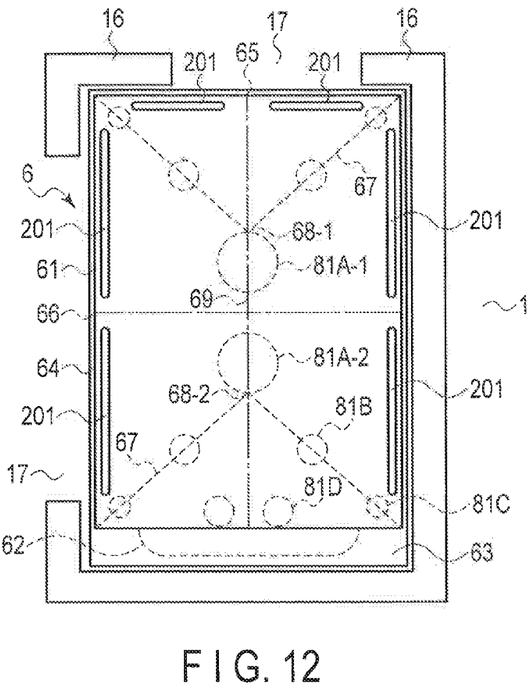
FIG. 12 is a modification of FIG. 1.

FIG. 12 shows a modification of FIG. 1.

As shown in the plan view of FIG. 12, the wall patterns 201 are not only provided on the short side of the region to be bonded 61 opposite to the short side where the driver of the display panel is provided but also provided on the long sides extending from both ends of the short side. The ventilation holes are respectively provided at the intersections of the wall patterns, the longitudinal central line of the rectangle, the perpendicular bisector of the central line, and two branch lines extending from the first Y-shaped intersection to both ends of one short side. The wall pattern is divided into six parts. In other respects, the configuration is similar to that in FIG. 1.

In FIG. 12, the adhesive coating pattern easily spreads in the part where the wall pattern 201 is formed, and the adhesive coating pattern does not easily spread in the part where the ventilation hole is formed. For example, even if the protective plate 6 and the display panel 5 are pushed more forcefully during press-bonding, the ventilation hole of the pattern can serve as an escape of air to promote the spread of the adhesive coating pattern in the part where the adhesive coating pattern does not easily spread, whereas the wall pattern can suppress the spread of the adhesive coating pattern in the part where the adhesive coating pattern easily spreads.

FIG. 3 is a plan view similar to FIG. 1, showing wall patterns and coating patterns according to another embodiment.

Figure 4:
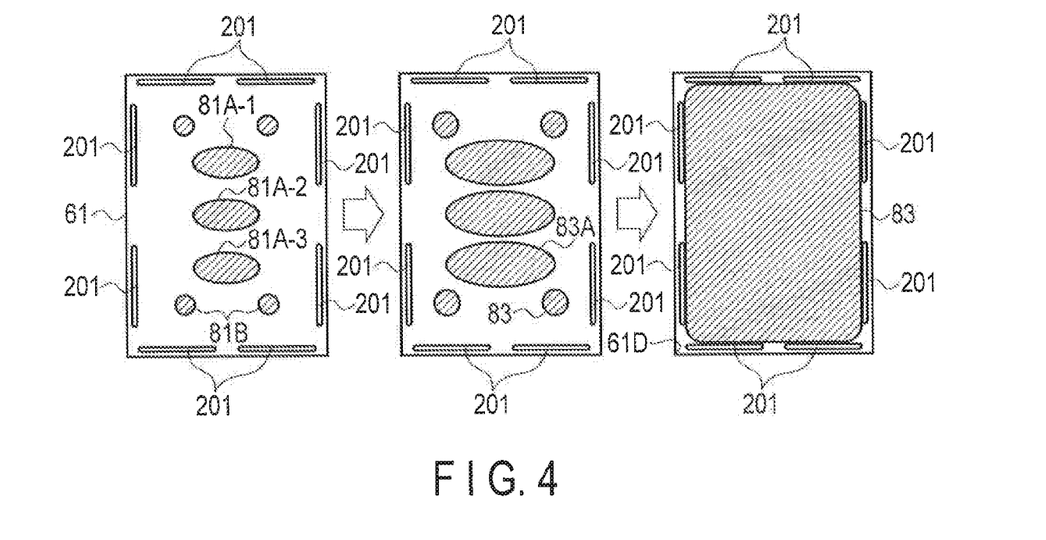
FIG. 4 is a set of plan views illustrating wall patterns and coating patterns according to a referential example, and their problems.

FIG. 4 is a set of plan views illustrating wall patterns and coating patterns according to a referential example, and their problems. In the example shown on the left side, the dot-like coating patterns located in the vicinity of the corners are eliminated from the coating patterns shown in FIG. 3. In the central illustration, the dot-like coating patterns spread by pressing are at a point immediately before clinging to each other. In the right side illustration, the point slightly before the end of the press-bonding operation is shown.

In the embodiment shown in FIG. 3, the outline of each of the no patterns 81 is elliptical, and the center of coating pattern 81A on the central line portion 69 is located exactly on the above-mentioned central line portion 69. However, the center of each of coating patterns 81B and 81C on the branch line 67 is located slightly off the branch line 67. More specifically, three coating patterns 81A are provided on the central line portion 69 in the bonding region 61 having a diagonal dimension of 3.0 inches and an aspect ratio of 1.58. Coating patterns 81A-1 to 81A-3 on the central line portion 69 are equal in dimension and shape, and have an oblateness of 0.46. The centers of coating patterns 81A-1 and 81A-3 on two sides are located in the vicinity of the Y-shaped intersection 68. The inner coating pattern 81B on the branch line 67 has an oblateness of 0.11, and its major axis substantially extends in the direction of the branch line 67. The outer coating pattern 81C on the branch line 67 has an oblateness of 0.19, and its major axis is in the direction of the long side of the region to be bonded 61. The three coating patterns 81A on the central line portion 69 account for 69% of the total area of the coating patterns, the four inner coating patterns 81B on the branch lines 67 account for 22%, and the four outer coating patterns 81C on the branch line 67 account for 9%. The total area of the coating patterns 81 accounts for about 12% of the area of the region to be bonded 61.

In the embodiment shown in FIG. 3, the wall patterns 201 are respectively provided on two opposite short sides and two opposite long sides of the rectangular region to be bonded 61. Ventilation holes are respectively provided at the intersections of the wall patterns 201, the longitudinal central line of the rectangular region to be bonded 61, the perpendicular bisector of the central line, two branch lines extending from the first Y-shaped intersection to both ends of one short side, and two branch lines extending from the second Y-shaped intersection to both ends of the other short side. The wall pattern 201 is divided into eight parts. The adhesive coating pattern easily spreads in the part where the wall pattern 201 is formed, and the adhesive coating pattern does not easily spread in the part where the ventilation hole is formed. For example, even if the protective plate 6 and the display panel 5 are pushed more forcefully during press-bonding, the ventilation hole of the pattern can serve as an escape of air to promote the spread of the adhesive coating pattern in the part where the adhesive coating pattern does not easily spread, whereas the wall pattern can suppress the spread of the adhesive coating pattern in the part where the adhesive coating pattern easily spreads.

In the referential example shown on the left side of FIG. 4, the outer coating patterns 81C on the branch lines 67 are eliminated from the embodiment of the wall patterns and the coating patterns shown in FIG. 3.

In the embodiment shown in FIG. 4, as in FIG. 3, the wall patterns 201 are respectively provided on two opposite short sides and two opposite long sides of the rectangular region to be bonded 61. Ventilation holes are respectively provided at the intersections of the wall patterns 201, the longitudinal central line of the rectangular region to be bonded 61, the perpendicular bisector of the central line, two branch lines extending from the first Y-shaped intersection to both ends of one short side, and two branch lines extending from the second Y-shaped intersection to both ends of the other short side. The wall pattern 201 is divided into eight parts by the ventilation holes.

Owing to the presence of the inner coating patterns 81B on the branch lines 67, the adhesive resin is rapidly and equally spread out to fill not only the center of the region to be bonded 61 but also the parts close to both short sides when the protective plate 6 and the display panel 5 are press-bonded. However, a small region located in the vicinity of a corner 61D alone is not sufficiently filled with the adhesive resin. That is, In addition to the inner coating pattern 81B on the branch line 67, the smaller coating pattern 81C is disposed on the outer side of the branch line 67. As a result, the adhesive resin can be spread over the entire region to be bonded 61 up to the corner parts during press-bonding, and it is possible to prevent the adhesive resin from running out of the region to be bonded 61. Moreover, even if the protective plate 6 and the display panel 5 are pushed more forcefully during press-bonding, the ventilation hole of the wall pattern 201 can serve as an escape of air to promote the spread of the adhesive coating pattern in the part where the adhesive coating pattern does not easily spread, whereas the wall pattern 201 suppresses the spread of the adhesive coating pattern to enable sufficient bonding so that the adhesive resin may not run out of the display panel and the protective plate in the part where the adhesive coating pattern easily spreads.

As suggested from FIG. 4, if coating pattern 81A on the central line portion 69 is elliptical rather than circular as in FIG. 1, a pattern of the adhesive resin layer 83 (the right side of FIG. 4) having a similar shape can be more smoothly formed in the region to be bonded 61. That is the edge of the adhesive resin layer 83 becomes parallel to each side of the region to be bonded 61 except for the parts located in the vicinity of the corners 61D of the region to be bonded 61 slightly before the adhesive resin solution is spread out to the edge of the region to be bonded 61 having the wall pattern 201 formed along its outer circumference. Here, the edge of the pattern of the adhesive resin layer 83 is equally distant from the respective sides of the region to be bonded 61. Meanwhile, adhesive resin patterns 83A and 83B that are still dot-like are shown in the center of FIG. 4. The adhesive resin patterns 83A and 83B are formed by coating patterns 81A and 81B that are spread out by press-bonding. In the condition shown in the center of FIG. 4, the adhesive resin patterns 83A and 83B are at a point immediately before clinging to each other, and still keep the shapes similar to coating patterns 81A and 81B. As is known from the center of FIG. 4, when the dot-like adhesive resin patterns 83A and 83B cling to each other as a result of the advance of the press-bonding, dot regions merge with each other at first. Therefore, air can easily escape in two directions from the initial contact point between the dot patterns, and does not left in the pattern of the adhesive resin layer 83.

Figure 5:
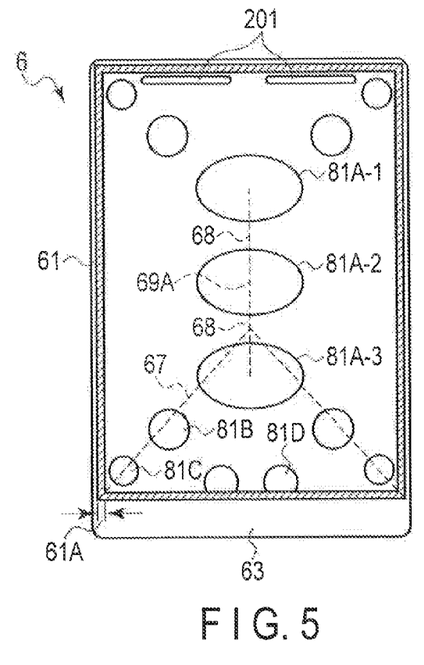
FIG. 5 is a plan view similar to FIG. 1 and FIG. 3, showing wall patterns and coating patterns according to yet another embodiment.

Wall patterns and coating patterns according to yet another embodiment are shown in FIG. 5.

In the embodiment shown in FIG. 5, the corrected central line portion 69A described earlier is employed. That is, three coating patterns 81A-1 to 81A-3 are arranged on the central line 65. The centers of coating patterns 81A-1 and 81A-3 on two sides are located outside two Y-shaped intersections 68. The distance between the centers of the two coating patterns 81A-1 and 81A-3, that is, the length of the corrected central line portion 69A accounts for 42% of the length of the rectangular region to be bonded 61. On the other hand, the outline of each of coating patterns 81B and 81C on the branch line 67 is circular, and its center is located substantially on the branch line 67. More specifically, the region to be bonded 61 has a diagonal dimension of 2.8 inches and an aspect ratio of 1.3. Coating patterns 81A-1 to 81A-3 on the corrected central line portion 69A are equal in dimension and shape, and have an oblateness of 0.50. The center of the inner coating pattern 81B on the branch line 67 is located slightly closer to the outside than the middle point of the branch line 67. The outline of the outer coating pattern 81C on the branch line 67 is in contact with or slightly separated from the print pattern 61A of the outline of the region to be bonded 61. As in FIG. 1, coating patterns 81D for the drive IC chip are disposed at the corners between the short side of the region to be bonded 61 on the side of the projecting region 63 and the central line 65. Coating pattern 81D for the drive IC chip has a circular outline, and is equal in diameter to the inner coating pattern 81B on the branch line 67. When coating patterns 81D for the drive IC chip are not taken into consideration, the three coating patterns 81A on the central line portion 69 account for 67% of the total area of the coating patterns, the four inner coating patterns 81B on the branch lines 67 account for 20%, and the four outer coating patterns 81C on the branch line 67 account for 13%. When coating patterns 81D for the drive IC chip are not taken into consideration, the total area of the coating patterns 81 accounts for about 18% of the area of the region to be bonded 61. When coating patterns 81D for the drive IC chip are included, the total area of the coating patterns 81 accounts for about 20%. As in FIG. 1, the wall pattern 201 is provided on the short side opposite to the short side where the drive IC chip of the display panel is provided. The wall pattern 201 has a ventilation hole at the intersection of this wall pattern and the longitudinal central line of the rectangle.

When the coating patterns according to the embodiments shown in FIG. 1, FIG. 3, and FIG. 5 are employed, it is possible to efficiently fill the entire region to be bonded with a proper amount of adhesive resin in a short period of time without any air bubbles remaining in the adhesive resin layer. That is, it is possible to fill the region to be bonded with the resin in a short period of time without any unfilled parts or any resin running over at the time of press-bonding. In particular, such filling in a proper amount without the formation of air bubbles is enabled by inexpensive equipment at room temperature under atmospheric pressure. The ventilation hole of the wall pattern can serve as an escape of air to promote the spread of the adhesive coating pattern in the part where the adhesive coating pattern does not easily spread, whereas the spread of the adhesive coating pattern can be suppressed to enable sufficient bonding so that the adhesive resin may not run out of the display panel and the protective plate in the part where the adhesive coating pattern easily spreads.

Figure 8:
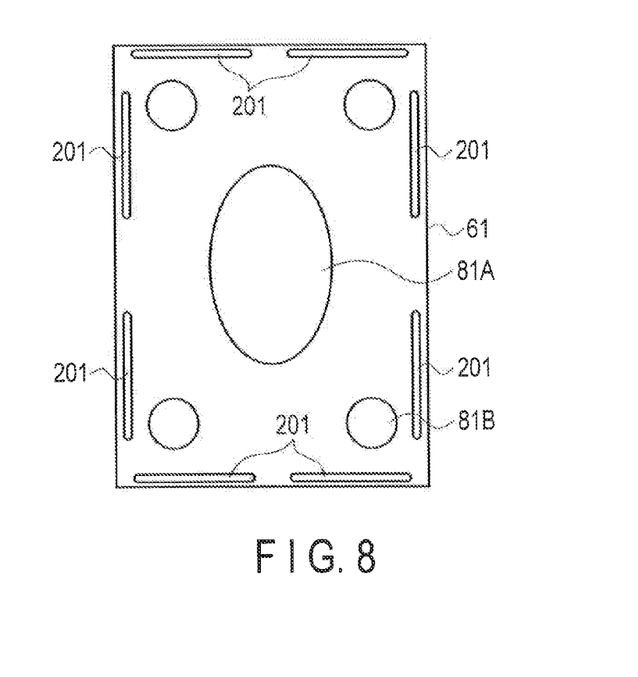
FIG. 8 is a plan view similar to FIG. 1 and FIG. 3, showing wall patterns and coating patterns according to yet another example.

Wall patterns and coating patterns according to yet another embodiment are shown in FIG. 8.

In the embodiment shown in FIG. 8, only one Coating pattern 81A is provided on the central line portion 69, and the major axis of its elliptical shape extends on the central line 65. One circular coating pattern 81B is provided on each branch line 67.

In the embodiment shown in FIG. 8, as in FIG. 3, the wall patterns 201 are respectively provided on two opposite short sides and on the long sides extending from both ends of the short sides. The intersections of the wall patterns 201, the longitudinal central line of the rectangle, the perpendicular bisector of the central line, two branch lines extending from the first Y-shaped intersection to both ends of one short side, and two branch lines extending from the second Y-shaped intersection to both ends of the other short side are open.

Figure 13:
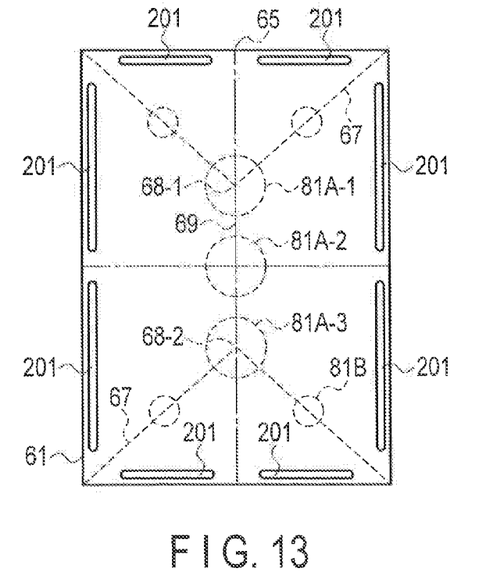
FIG. 13 is a view showing wall patterns and coating patterns according to yet another embodiment.

Wall patterns and coating patterns according to yet another embodiment are shown in FIG. 13.

In the example shown in FIG. 13, three circular coating patterns 81A-1 to 81A-3 are provided on the central line portion 69, and the major axes of their circular shapes extend on the central line 65. One circular floating pattern 81B is provided on each branch line 67.

In the embodiment shown in FIG. 13, as in FIG. 3, the wall patterns 201 are respectively provided on two opposite short sides and on the long sides extending from both ends of the short sides. The ventilation holes are respectively provided at the intersections of the wall patterns 201, the longitudinal central line of the rectangle, the perpendicular bisector of the central line, two branch lines extending from the first Y-shaped intersection to both ends of one short side, and two branch lines extending from the second Y-shaped intersection to both ends of the other short side.

In FIG. 13, the adhesive coating pattern easily spreads in the part where the wall pattern 201 is formed, and the adhesive coating pattern does not easily spread in the part where the ventilation hole is formed. For example, even if the protective plate 6 and the display panel 5 are pushed more forcefully during press-bonding, the ventilation hole of the pattern can serve as an escape of air to promote the spread of the adhesive coating pattern in the part where the adhesive coating pattern does not easily spread, whereas the wall pattern can suppress the spread of the adhesive coating pattern in the part where the adhesive coating pattern easily spreads.

According to the embodiments described above, the vertical movement support mechanism 41 is provided on the upper side of the press-bonding head 2 in the press-bonding station 10C, and pressing is performed by lowering the press-bonding head 2. However, pressing may be performed by connecting the vertical movement support mechanism 41 to the lower press-bonding stage 7 and lifting the press-bonding stage 7. In some cases, pressing force may be applied from above and beneath. Therefore, even if the present specification simply describes that the press-bonding head 2 is lowered, it should be understood that the press-bonding head 2 is lowered relative to the press-bonding stage 7.

Figure 11:
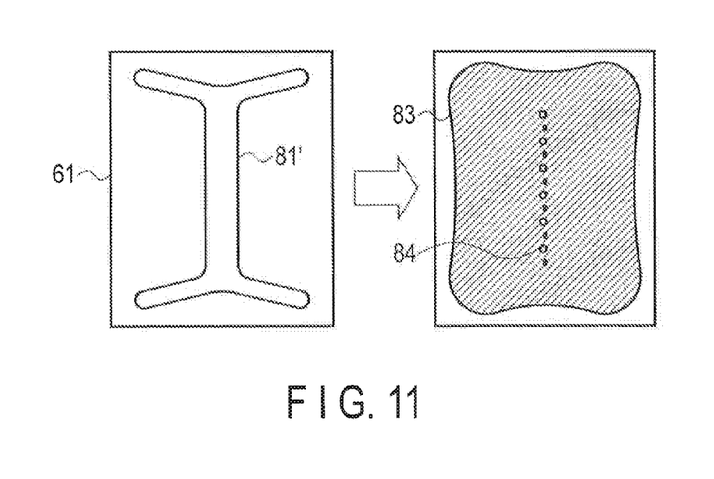
FIG. 11 is a set of plan views similar to FIG. 4 showing a coating pattern according to a comparative example, and its problems.

One linear coating pattern 81' is shown in the left part of FIG. 11 as a comparative example of the coating pattern. As shown in the right side of FIG. 11, to large number of air bubbles 84 remain along the central line 65 during press-bonding. The edge of the adhesive resin layer 83 immediately before spreading over the entire region to be bonded 61 is not parallel to the long sides and short sides of the region to be bonded 61. Therefore, a longer pressing time is required to spread out a proper amount of adhesive resin over the entire region to be bonded 61.

The method for attaching the display panel and the protective plate to each other and the attaching device described above are not limited to the manufacture of the liquid crystal display, and can also be used to manufacture an organic electroluminescent display and other flat displays.

It is possible to prevent the entrapment of air bubbles in the bonding layer and also prevent the bonding layer from running over. Moreover, it is possible to reduce the manufacturing costs, improve manufacturing efficiency, and reduce the space to set a manufacturing device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method for manufacturing a flat display comprising:
    forming a wall pattern on the surface of one of a display panel of a flat display and a protective plate configured to protect the display panel, along the outer circumference of a region to be bonded in which to provide a bonding layer between the display panel and the protective plate:
    forming a dot-like adhesive coating pattern in the region to be bonded on the surface of one of the display panel and the protective plate;
    attaching the protective plate and the display panel to each other via the adhesive coating pattern under normal pressures, pressing the protective plate and the display panel, and spreading out the adhesive coating pattern in the region to be bonded to form an uncured bonding layer; and
    curing the uncured bonding layer while the protective plate and the display panel are attached to each other, and forming a cured bonding layer,
    wherin the region to be bonded has a rectangular shape corresponding to a display region of the display panel, a point where lines extending from both ends of one short side of the region to be bonded join a longitudinal central lines of the rectangle is a first Y-shaped intersection, a point where lines extending from both ends of the other short side join the longitudinal central line of the rectangle is a second Y-shaped intersection, and a two-way Y-shaped line patten is set, the two-way Y-shaped line pattern comprising a central line portion which connects the first and second ,Y-shaped intersection to each other other, two branch lines extending from the first Y-shaped intersection to both ends of the one short side, and two branch lines extending from the second Y-shape intersection to both ends of the other short side; and
    wherein the wall pattern has ventilation holes at the intersection of this wall pattern, the longitude central line of the rectangle, a perpendicular bisector of the central line the two branch lines extending from the first Y-shaped intersection to both ends of the one short side, and the two branch lines extending from the second Y-shaped intersection to both ends of the other short side.

2. The method for manufacturing a flat display according to claim 1, wherein the ones extending from both ends of the short side subtend an angle of 45 degrees to the short side.

3. The method for manufacturing a flat display according to claim 1, wherein a plurality of dot-like adhesive patterns are formed in the region to be bonded in the process of the application of the adhesive, and central points of the dot-like adhesive patterns are disposed on the central line portion in the second Y-shaped line pattern and on or in the vicinity of the four branch lines, and disposed symmetrically with respect to the central line and the perpendicular bisector thereof.

4. The method for manufacturing a flat display according to claim 1, wherein the area of the adhesive coating pattern on the central line portion accounts for 50 to 70% of the total area or total coating amount of the adhesive coating patterns, and the area of the adhesive coating pattern on the branch line accounts for 30 to 50%.

5. The method for manufacturing a flat display according to claim 1, wherein the aspect ratio of the rectangle is 1.3 to 2.0, the dot-like adhesive coating pattern on the central line portion is an ellipse having a major axis thereof disposed in a direction perpendicular to the central line, and the oblateness of the ellipse is within a range of 0.5 to 2.5.

6. The method for manufacturing a flat display according to claim 1 wherein on each branch line, the dot-like adhesive coating patterns are disposed in two parts located in the vicinity of the middle point of the branch line and in the vicinity of a corner of the rectangle, and the adhesive coating pattern disposed in the vicinity of the corner is smaller than the adhesive coating pattern disposed in the vicinity of the middle point.

7. The method for manufacturing a flat display according to claim 1, wherein the display panel used has a connection peripheral edge which is continuous from the display surface via a step and which is connectable to the driver, the protector used has a projecting region that covers the connection peripheral edge, and in the process of forming the adhesive coating pattern, an additional adhesive coating pattern is further disposed in the region to be bonded in addition to the former adhesive coating pattern in the vicinity of the edge of the region to be bonded along the step, the additional adhesive coating pattern running out of the region to be bonded to fill the space between the projecting region and the connection peripheral edge during the attachment.

8. The method for manufacturing to fiat display according to claim 7, wherein the step is located along the other short side, and the structure reinforcing coating patterns are disposed symmetrically with respect to the central line in the vicinity of corners between the other short side and the central line.

\* \* \* \* \*